May 17, 1932. G. A. SALZGEBER Re. 18,474

MAGNETIC COMPASS

Original Filed July 5, 1928

Inventor.
Gustave A. Salzgeber
by Heard Smith & Tennant.
Attys.

Reissued May 17, 1932

Re. 18,474

UNITED STATES PATENT OFFICE

GUSTAVE A. SALZGEBER, OF EAST MILTON, MASSACHUSETTS

MAGNETIC COMPASS

Original No. 1,799,648, dated April 7, 1931, Serial No. 290,301, filed July 5, 1928. Application for reissue filed February 20, 1932. Serial No. 594,343.

This invention relates to magnetic compasses and has for one of its objects to provide a novel manner of supporting the compass bowl so as to minimize the effect of jar or vibration on the magnetic needle.

Another object of the invention is to provide an improved manner of mounting the compass on an instrument board or other compass-carrying member.

Still another object of the invention is to provide improvements in a liquid compass for compensating for the expansion and contraction of the liquid.

Still other objects of the invention are to improve magnetic compasses in various particulars all as will be more fully hereinafter set forth.

In order to give an understanding of the invention I have illustrated in the drawings a selected embodiment thereof which will now be described after which the novel features will be pointed out in the appended claims.

Figure 1:
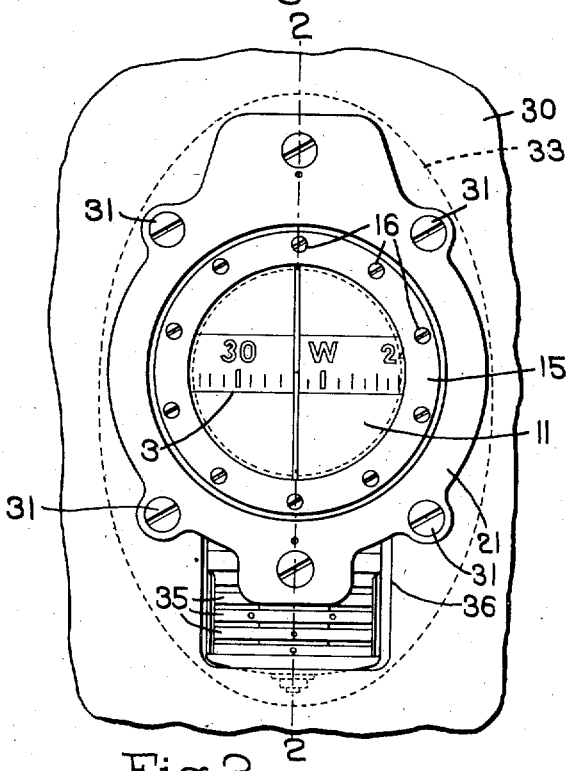
Fig. 1 is a front view of a compass embodying my invention showing it mounted on a dash or instrument board but with the cover plate omitted.
Figure 2:
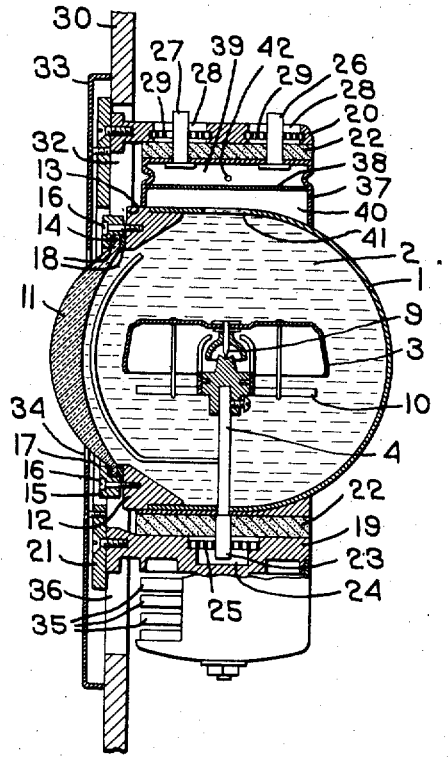
Fig. 2 is a section on the line 2—2, Fig. 1.

My invention is herein illustrated as applied to a liquid compass, that is, one in which the compass card is enclosed in a bowl which is filled with liquid and which has an opening in one side covered by a glass window through which the card may be observed.

In the drawings the bowl is indicated at 1 and it has a general spherical shape, it being filled with a suitable liquid 2. 3 indicates the compass card which is pivotally mounted on a support 4 rising from the bottom of the bowl all as usual. This compass card has the general construction illustrated in my Patent No. 1,840,133, dated January 5, 1932, in that it is made from a single piece of sheet metal which is cut out and pressed to shape to provide the central portion 5, the ribbed arms 6 extending radially from the central portion 5, the rim portion 7 connecting the arms at their outer ends and the depending skirt portion 8 on which are marked the desired graduations. The center portion 5 is formed with a pivot pin 9 which forms a pivot for the structure. This card supports two magnetic members 10 which give it the desired magnetic properties.

The bowl 1 is provided with an opening in one side which is closed by a glass 11 through which the card may be seen and which conforms to the general spherical shape of the bowl end. I propose to make the bowl 1 of sheet metal which is pressed into the desired shape. The glass 11, which is shown as a spherical lens, is secured to an annular supporting ring 12 which is fitted into an opening formed in the sheet metal body 1. This ring 12 has the flat face 13 standing in plane at right angles to the axis of the glass 11 and the glass is provided at its periphery with a flange 14 having opposed flat parallel faces, said faces being in planes perpendicular to the axis of the glass. These flat faces of the flange 14 ar parallel with the flat face 13 of the ring 12.

The glass is clamped in position by a clamping ring 15 which is secured to the anchoring ring 12 by suitable screws 16 and it is provided with a lip 17 that overlies the flat faced flange 14 of the glass. A suitable packing 18 will preferably be placed between the glass and both the flat face 13 and the lip 17. With this construction the clamping pressure against the glass of the clamping ring 15 is applied through the lip 17 and is in a direction at right angles to the flat faces of the flange 14. With this construction the tendency to break the glass due to clamping pressure thereon is minimized so that it is possible to secure a perfectly tight joint at the edge of the glass without any special danger of breaking the glass.

The compass bowl 1 is secured to and supported by a compass-supporting member, herein shown as a plate 21, provided with two bracket arms 19 and 20 between which the bowl 1 is received. 22 indicates felt or other cushioning material interposed between the bowl and the arms for the purpose of cushioning the bowl and taking up shock or vibration.

As a further means of cushioning the bowl and absorbing shock and vibration and also for maintaining the bowl in proper position I have provided the following means.

Figure 3:
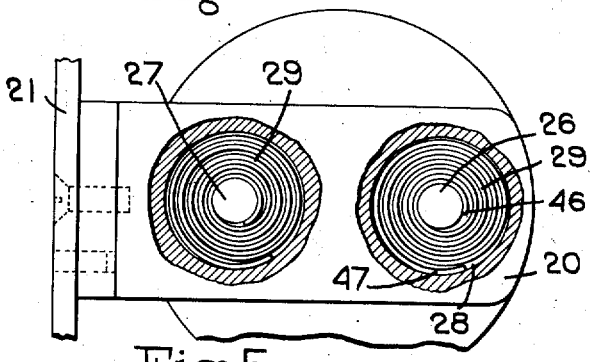
Fig. 3 is a top plan view with a part broken out showing the construction and location of the snubber pins.

Depending from the lower end of the bowl is a centering pin 23 which is received in a relatively large recess 24 formed in the bracket arm 19. This pin is connected to the walls of the recess 24 by a centering and shock-absorbing spring 25 which is in the nature of a coiled spring having one end fastened to the pin 23 and the other end fastened to the wall of the recess 24. At the upper end of the bowl I provide two such pins, both of which are non-axially arranged. These pins are indicated at 26 and 27 respectively, each being rigidly anchored to the bowl and each extending through a relatively large opening 28 formed in the bracket arm 20. Each pin is held in position in the opening by a coiled or spiral spring 29, one end of which is fastened to the pin as shown at 46, Fig. 3 and the other end of which is fastened to a wall of the opening 28 as shown at 47. The felt disks 22 absorb any vibration in a vertical direction and prevent such vibration from being transmitted to the compass bowl. The pins 23, 26, 27 and the springs 25, 29 act to absorb lateral vibration and with this method of mounting the bowl the compass card will be relatively unaffected by vibration.

Since the pin 23 is in the axial line of the compass bowl it will ensure that the bowl is properly centered and the pins 26, 27 limit the oscillating or turning movement of the bowl and also form shock-absorbing devices.

The compass and its supporting member are mounted on a compass-carrying member in such a way as to provide a substantially flush mounting for the compass bowl. This compass-carrying member may be of any desired type or shape and in the drawings it is shown as an instrument board 30.

The supporting plate 21 is secured to the instrument board by suitable screws 31 and as herein illustrated said plate is located on the front of said board and the latter is provided with an opening 32 through which the bracket arms 19 and 20 extend. The compass bowl, therefore, is situated behind the instrument board and the spherical lens member 11 projects slightly through the instrument board thus bringing the compass substantially flush with the instrument board. The opening 32 in the instrument board is covered by a cover plate 33 which is provided with a sight opening 34 through which the compass may be read.

The compass is provided with suitable adjusting disks 35 which are situated in axial alignment with the compass card and by which compensating adjustments may be made to compensate for the magnetic influence on the compass of any iron which may be located in the vicinity. The opening 32 in the instrument board 30 is formed with the extension 36 which is located opposite these disks so that when the cover plate is removed as shown in Fig. 1 the compensating disks are accessible for adjustment.

The bowls of compasses of this type are usually filled with some liquid and one feature of my invention relates to a novel means to compensate for the expansion and contraction of the liquid due to temperature changes. The bowl is formed above its lower end with the extension 37 to the top of which the pins 26, 27 are secured. This extension is divided by a diaphragm 38 into an upper chamber 39 and a lower chamber 40, which lower chamber communicates with the interior of the bowl through an opening 41.

The bowl 1 is filled with liquid but there will preferably be air confined in the chamber 40.

The chamber 39 communicates with the atmosphere through a port 42 and hence there will always be atmospheric pressure in said chamber. The diaphragm 38 is capable of moving up and down as the pressure varies. If the liquid 2 in the bowl expands due to a rise in temperature such expansion will compress the air in the chamber 40 and will result in forcing the diaphragm 38 upwardly, the compressing of the air and the upward movement of the diaphragm being sufficient to compensate for the expansion of the liquid 2. In case the liquid contracts the expansion of the air confined in the chamber 40 and the resilience of the diaphragm will follow the contraction.

Thus with my invention the liquid in the bowl 1 acts on the diaphragm through a body of air. This is of special advantage in connection with airplanes since airplanes are apt to make rather rapid changes in elevation and hence will move relatively rapidly from a zone of lighter air pressure to one of heavier air pressure and vice versa. The confined body of air in the chamber 40 together with the action of the diaphragm compensates for these changes in air pressure due to varying altitudes so as to maintain substantially uniform working conditions within the bowl. Since the chamber 40 which contains the air bubble is located outside of the bowl 1, said bubble will not be visible within the bowl and hence the presence of the air in the chamber 40 does not interfere with the reading of the compass card. The presence of the air, however, is quite advantageous because the air itself provides an elastic medium which compensates to a certain extent for any expansion of the liquid 2, and this air, together with the diaphragm 38, provides complete compensation for any expansion which may occur.

Figure 4:
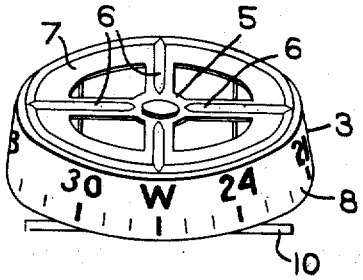
Fig. 4 is a perspective view of the compass card.

In forming the compass card I first print the graduations on a piece of sheet metal before it is died out or deformed and then I place the metal in a suitable press and die out the imprinted piece of sheet metal to produce the proper blank and then bend this blank into the shape shown in Fig. 4.

Figure 5:
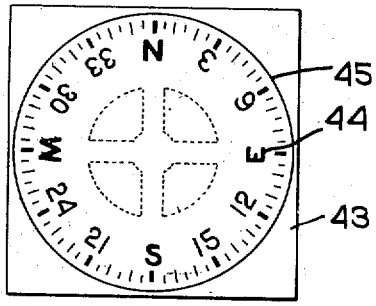
Fig. 5 is a view of the blank sheet of metal from which the card is made.

In Fig. 5, 43 indicates a piece of sheet metal from which the compass card is to be made. The first operation is to imprint on this the graduations as shown at 44. The operation of printing or impressing the graduations on a plain piece of metal is a relatively simple one, much more simple than printing or impressing them on a circular piece such as the completed card is. After the graduations have been imprinted on the plain piece of sheet metal 43 then it is subjected to the action of a punch press and is cut into disk form along the line 45 and is also punched to produce the arms 6 and central portion 5 as shown in dotted lines Fig. 5. At the same time or subsequently the blank is subjected to the action of dies which form the strengthening ribs in the arms 6 and also bend the graduated portion of the disk downwardly to form the depending skirt.

In order that the graduations may appear correctly and without distortion in the completed card I propose to print them on the sheet 43 in a slightly distorted manner. The characters are printed so that they are wider at the bottom than at the top. When the sheet metal is subjected to the action of the forming dies to bend the skirt portion into the desired form there will be a distortion of the graduated portion of the disk which will correct or compensate for the distortion originally given to the characters. As a result the characters will appear on the disk in proper shape and without any distortion.

I propose to use for the magnet bars 10 a cobalt steel because of its properties. The use of cobalt steel for this purpose renders the magnet more sensitive and accurate.

I claim:

1. In a compass, the combination with a supporting member having two supporting arms, of a compass bowl having a compass card therein retained between said arms, one of said arms having an opening situated axially of the compass card and the other having two openings situated non-axially of the card, a centering pin carried by the compass bowl and entering the axial opening, two steadying pins rigid with the compass bowl and entering the other openings, and a coiled or spiral spring encircling each pin and yieldingly connecting it to the corresponding supporting arm.

2. The combination with an instrument board having an opening, of a supporting plate secured to the front of the board, said plate having supporting arms extending through the opening of said board and also having a sight opening between the arms and in line with the opening in the instrument board, a compass bowl secured to said arms and situated at the rear of the instrument board, the wall of the bowl opposite said opening being transparent, and a magnetically-controlled compass card within said bowl.

3. The combination with an instrument board having an opening, of a supporting plate secured to the front of the board, said plate having supporting arms extending through the opening of said board and also having a sight opening between the arms, a compass bowl secured to said arms, the wall of the bowl adjacent said opening being transparent, a cover plate secured to the supporting plate and covering the latter, said cover plate also having a sight opening through which the transparent wall of the bowl is visible.

4. The combination with an instrument board having an opening, of a supporting plate secured to the board and having supporting arms and also having a sight opening between the arms and in line with the opening in the instrument board, a compass bowl situated in the rear of the instrument board and secured to said arms, the wall of the bowl opposite said openings being transparent and being in the form of a spherical lens and projecting slightly through said openings, and a magnetically-controlled compass card within the bowl and visible through the transparent portion thereof.

5. The combination with an instrument board having an opening, of a supporting plate secured to the instrument board, said plate having supporting arms and an opening between said arms in line with the opening of the instrument board, a compass bowl secured to said arms and situated in the rear of the instrument board, said compass bowl having a general spherical shape and the portion of the wall thereof opposite said openings being transparent and projecting slightly through said openings, and a magnetically-controlled compass card within the bowl visible through the transparent portion thereof.

6. A compass comprising a compass bowl containing liquid and having a window on one side, said bowl having above its lower end an extension divided by a flexible diaphragm into two chambers, both situated outside of the bowl, and one of which communicates with the interior of the bowl and contains air which remains trapped in said chamber and the other of which communicates with the atmosphere, and a compass card in said bowl, the air in the first-named chamber and the flexible diaphragm co-operating to compensate for expansion and contraction of the liquid in the bowl.

7. The combination with an instrument board having an opening, of a supporting member secured to the instrument board, a compass bowl mounted on the supporting member and situated in the rear of the instrument board and visible through said opening, the wall of the compass bowl which is thus visible through said opening in the instrument board being transparent and in the form of a spherical lens, and a magnetically-controlled compass card within the bowl and visible through said spherical lens.

In tesimony whereof, I have signed my name to this specification.

GUSTAVE A. SALZGEBER.